United States Patent
Yamazaki

(10) Patent No.: US 7,474,898 B2
(45) Date of Patent: Jan. 6, 2009

(54) MOBILE STATION CONTROLLING ANTENNA DIRECTIONALITY

(75) Inventor: Toru Yamazaki, Chita (JP)

(73) Assignee: Denso Corporation, Kariya (JP)

( * ) Notice: Subject to any disclaimer, the term of this patent is extended or adjusted under 35 U.S.C. 154(b) by 1203 days.

(21) Appl. No.: 10/463,645

(22) Filed: Jun. 17, 2003

(65) Prior Publication Data
US 2003/0236096 A1     Dec. 25, 2003

(30) Foreign Application Priority Data
Jun. 24, 2002   (JP)   ............... 2002-182871

(51) Int. Cl.
*H04Q 7/20*   (2006.01)
*H01Q 3/00*   (2006.01)
(52) U.S. Cl. ............... 455/456.6; 455/456.1; 455/556.1
(58) Field of Classification Search ............. 455/456.6, 455/456.1, 556.1, 561, 101, 562.1, 441; 342/368
See application file for complete search history.

(56) References Cited
FOREIGN PATENT DOCUMENTS

| EP | 0 540 387 | 5/1993 |
|---|---|---|
| EP | 0 932 319 | 5/2003 |
| JP | 07-087011 | 3/1995 |
| JP | 07087011 A * | 3/1995 |
| JP | 09233564 A * | 9/1997 |
| JP | 11215538 A * | 8/1999 |
| JP | 2000-22618 | 1/2000 |
| JP | 2000-341202 | 12/2000 |
| JP | 2000341202 A * | 12/2000 |
| JP | 2001-168784 | 6/2001 |
| JP | 2002026800 A * | 1/2002 |
| JP | 2002-152114 | 5/2002 |
| JP | 2002152114 A * | 5/2002 |

* cited by examiner

*Primary Examiner*—Melur Ramakrishnaiah
(74) *Attorney, Agent, or Firm*—Harness, Dickey & Pierce, PLC

(57) ABSTRACT

A mobile communication terminal mounted in a vehicle sends a state parameter to a CDMA network through an antenna. The state parameter includes own position information obtained from an autonomous positioning device through a communications bus and detection signals obtained from a vehicle speed sensor and a gyroscope. The own position information is computed by the autonomous positioning device based on GPS signals. In the CDMA network, an azimuth angle from a vehicle-traveling direction to a base station with which the terminal communicates is computed based on the state parameter. The azimuth angle is sent as an antenna control parameter to the terminal. In the terminal, an antenna control circuit controls directionality of a phased array antenna based on the antenna control parameter.

12 Claims, 10 Drawing Sheets

ANTENNA CONTROL PR: $\theta$
$\theta = \alpha - \alpha'$

MOBILE STATION CONTROLLING ANTENNA DIRECTIONALITY

CROSS REFERENCE TO RELATED APPLICATIONS

This application is based on and incorporates herein by reference Japanese Patent Application No. 2002-182871 filed on Jun. 24, 2002.

FIELD OF THE INVENTION

The present invention relates to a mobile station which controls antenna directionality according to a directionality control parameter computed based on an own position.

BACKGROUND OF THE INVENTION

Conventionally, there is a wireless access system in which a wireless link is established by varying a direction and a beam angle of an antenna of a base station based on position information of a mobile station estimated by the base station (JP-2000-22618A). However, directionality of an antenna mounted in the mobile station is not controlled, so that communications quality in the mobile station is not sufficiently attained. Hence, the communications quality needs to be enhanced so as to realize broadband communications.

SUMMARY OF THE INVENTION

It is an object of the present invention to provide a mobile station that controls antenna directionality based on an own position. This results in enhancing communications quality in the mobile station.

To achieve the above object, a mobile station is provided with the following. The mobile station transmits, to a base station, a state parameter that includes a traveling direction and position-specifying information that specifies an own position. It receives, from the base station, an antenna control parameter for controlling antenna directionality of an antenna. The antenna control parameter is computed, based on the state parameter, in the communications network. The antenna directionality relative to the base station is controlled based on the antenna control parameter, so as to increase signal strength of a reception signal from the base station. This structure enables the antenna directionality to flexibly correspond to relative position from the mobile station to the base station. This results in enhancing communications quality between the mobile station and the base station. Furthermore, computing the antenna control parameter in the network leads to lowering of a computation load in the mobile station and rapid controlling of the antenna directionality.

It is preferable that a mobile station is provided with the following. Communications quality of a reception signal from a base station is measured, and the antenna directionality is amended when it is determined that the communications quality is determined to be low. It is further preferable that a mobile station is provided with the following. The antenna control parameter is amended according to a predicted traveling direction computed based on a traveling direction and a traveling speed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
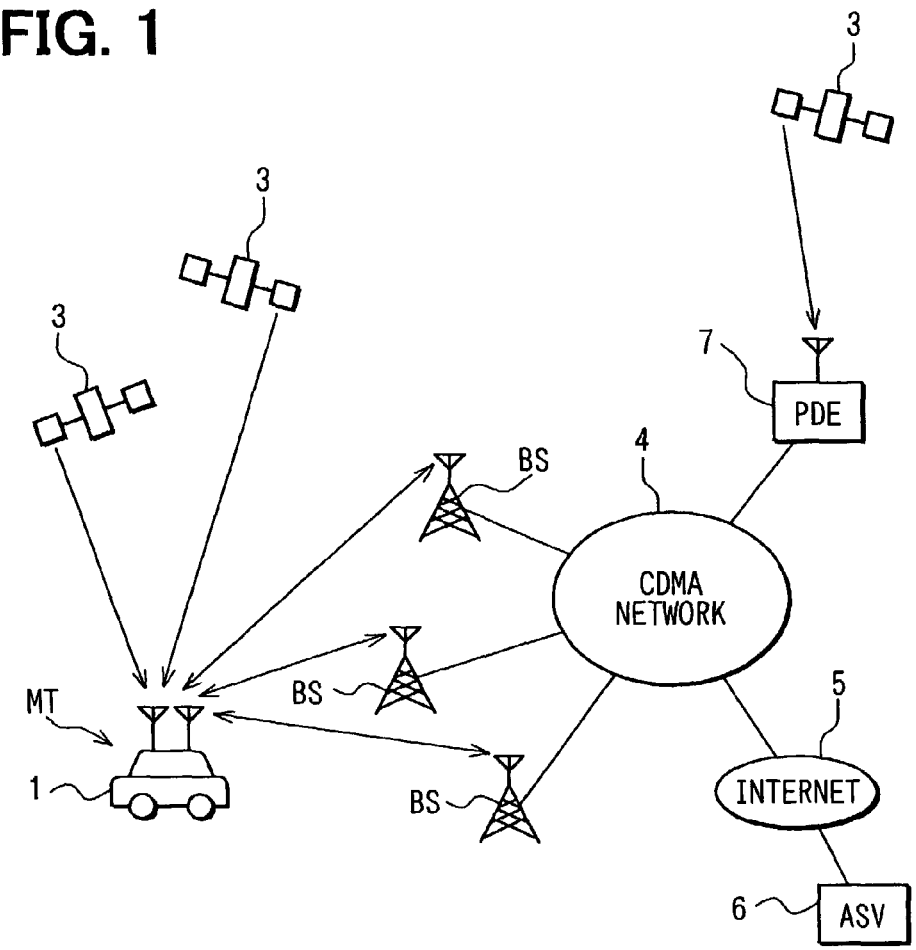
FIG. 1 is a schematic view showing overall structure according to embodiments of the present invention.

As shown in FIG. 1, a communications system in embodiments of the present invention includes: a mobile communication terminal MT (hereinafter referred to "terminal") mounted in a vehicle 1; a code division multiple access (CDMA) network 4; a plurality of base stations BS forming the CDMA network 4; the Internet 5 connected with the CDMA network 4; and an application server (ASV) 6 that is connected with the Internet 5 and computes an antenna control parameter (PR). Position determination equipment (PDE) also shown in FIG. 1 is only used in a third embodiment and explained later.

Figure 2:
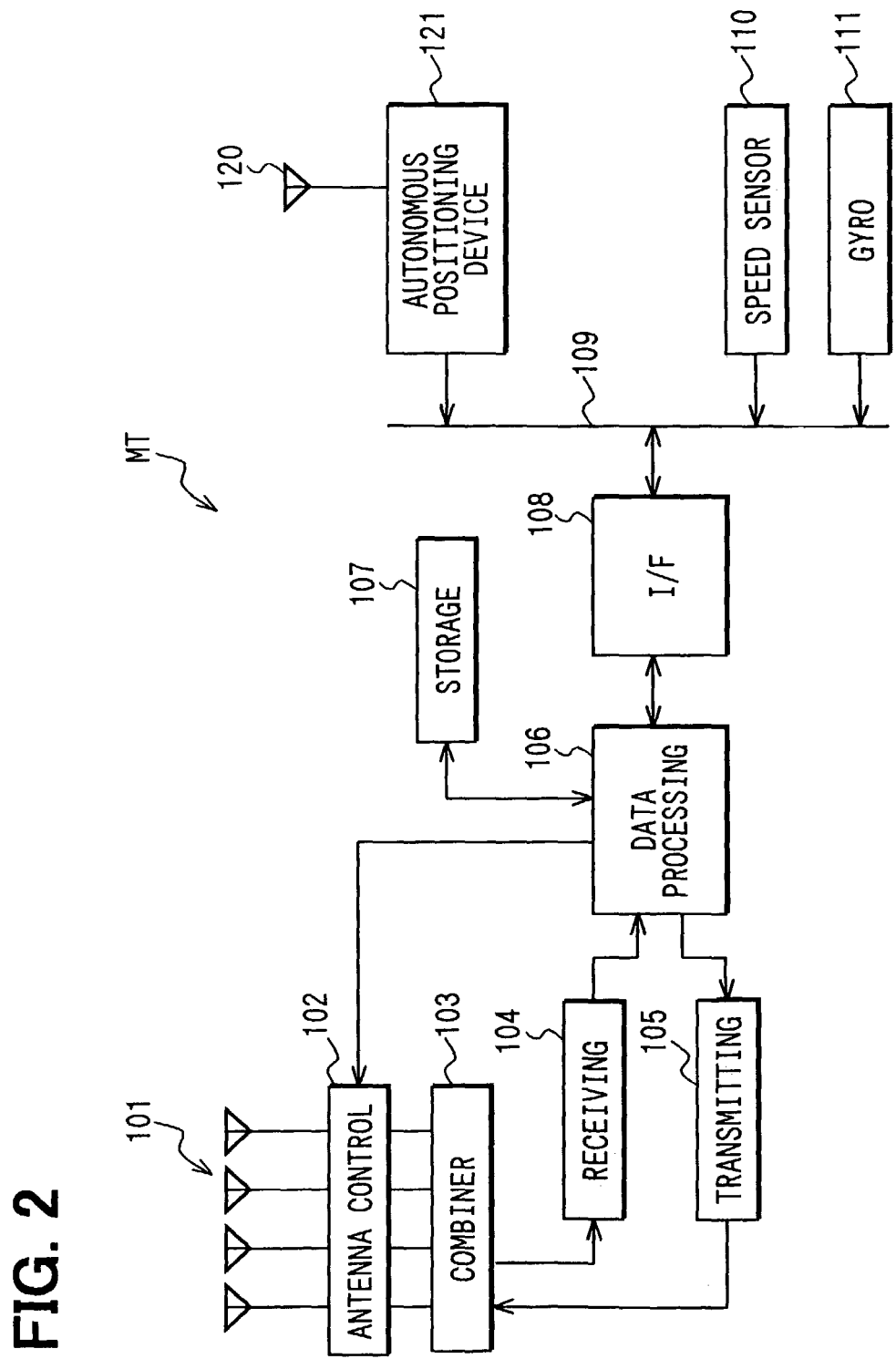
FIG. 2 is a block diagram showing structure of a mobile communication terminal according to a first embodiment.

As shown in FIG. 2, the terminal MT includes: an antenna 101 formed of a plurality of antenna elements; an antenna control circuit 102; a combiner 103; a reception module 104; a transmission module 105; a data processing circuit 106; a memory storage circuit 107; and a serial input/output interface (I/O IF) circuit 108.

The antenna 101 is a nondirectional antenna and its elements (e.g., from four to eight) are disposed, in predetermined spacing, on a roof of the vehicle 1. Respective phases of output signals of the antenna elements are controlled by the antenna control circuit 102. Directionality of the antenna 101 as an overall antenna is thereby controlled for a required direction. This results in forming a phased array antenna.

The antenna control circuit 102 has phase shifters (not shown) whose phasing control amounts are determined by an instruction value of the data processing circuit 106. The phase shifters are provided to the respective antenna elements.

The combiner 103 synthesizes, in receiving, an output signal from the antenna control circuit 102 to transmit to the reception module 104. The output signal includes an antenna control parameter outputted from the respective elements of the antenna 101. The combiner 103 divides, in transmitting, a transmission signal correspondingly to the respective elements of the antenna 101 to transmit to the antenna control circuit 102. The transmission signal includes a state parameter from the transmission module 105.

The output signal from the combiner 103 is in the reception module 104 converted from an analog signal to a digital signal and into digital information through demodulation.

The data processing circuit 106 executes data processing for the digital information to transmit to the transmission module 105, stores a processing result in the data storage circuit 107, or obtains information from external devices through the I/O IF circuit 108.

The data storage circuit 107 includes ROM where a communications program is previously stored, and RAM and flash memory where the processing result and the information from the external devices are temporarily stored.

The vehicle 1 includes: a speed sensor 110 that detects a vehicle speed; a gyroscope 111 that detects an angle of traverse; a global positioning system (GPS) antenna 120; and an autonomous positioning device 121 that computes an own current position based on GPS signals from GPS satellites 3 through the GPS antenna 120. These detected values and computed result are inputted to the terminal MT through a communications bus 109.

Figure 3:
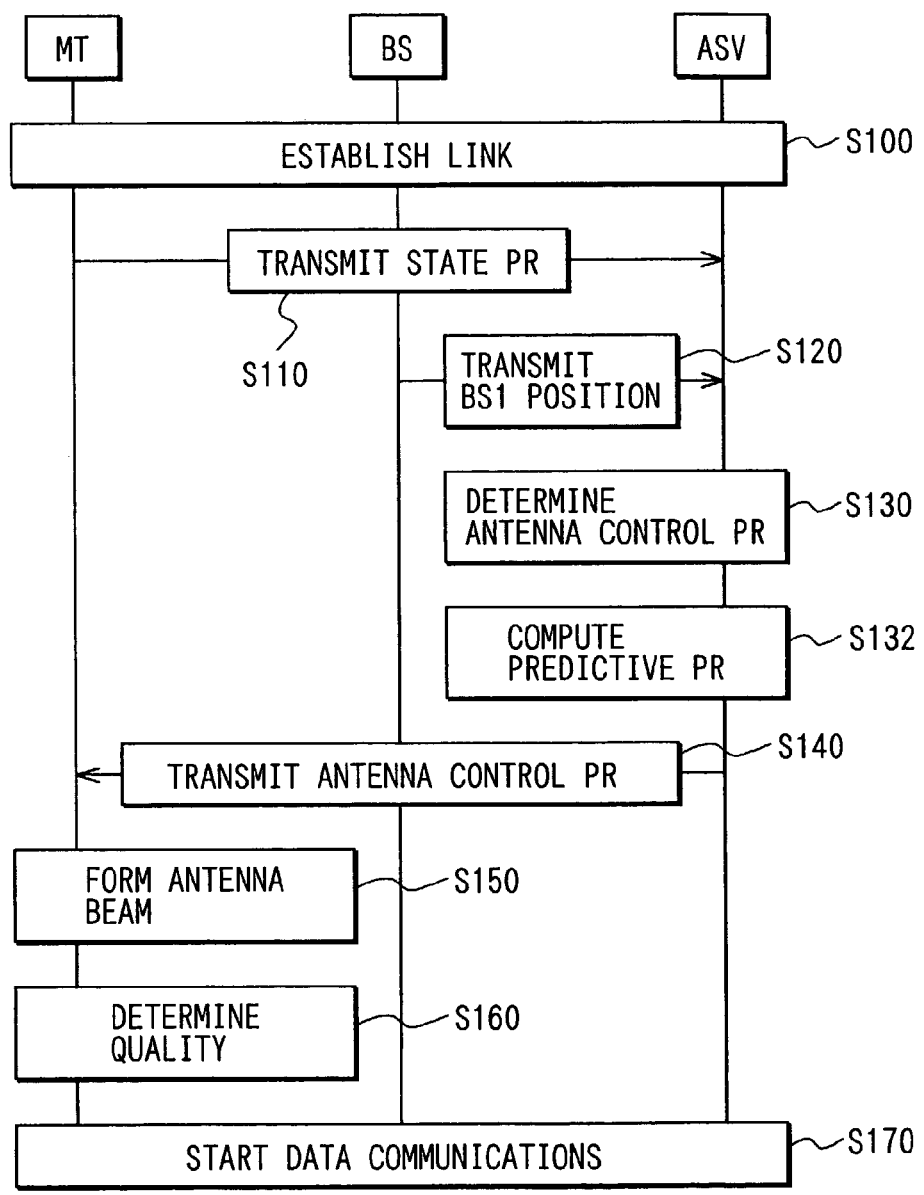
FIG. 3 is a flowchart diagram explaining a communications procedure according to the first embodiment.

Referring to FIG. 3, a communications procedure of a first embodiment will be explained below. FIG. 3 includes communications and processing procedures among the terminal MT, the base stations BS, and the ASV 6. The communications and the processing procedures are executed by respective computers of the terminal MT, the base stations BS, and the ASV 6.

At Step S100, as the terminal MT transmits a link request and establishes a communications link with a certain base station (connected base station) BS1 adjoining the vehicle 1, information regarding the communications link is transmitted to the ASV 6. The information regarding the communications link includes identification numbers of the terminal MT and the connected base station BS1 is transmitted to the ASV 6. Here, typically, there is interference under radio wave environment relating to the terminal MT and the antenna 101 of the terminal MT remains nondirectional before directionality is not controlled.

Figure 4:
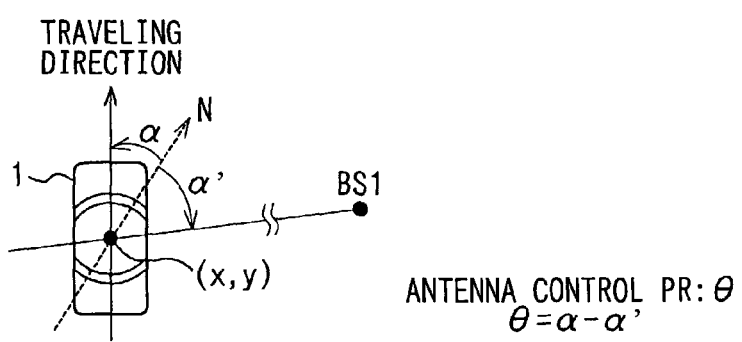
FIG. 4 is a schematic view explaining an antenna control parameter.

At Step S110, the terminal MT transmits the state parameter (PR) of the terminal MT to the ASV 6 through the connected base station BS1. The state parameter (PR) of the terminal MT is obtained by the data processing circuit 106, and includes: a vehicle current position (x, y) computed by the autonomous positioning device 121; an averaged vehicle speed and an azimuth angle of a vehicle-traveling direction; and current time. The average vehicle speed and the azimuth angle are computed by the data processing circuit 106 from a detection value of the vehicle speed sensor 110 and an output signal of the gyroscope 111. The azimuth angle of the vehicle-traveling direction is computed as an angle $\alpha$ to a traveling direction from the north direction in anticlockwise rotation as shown in FIG. 4.

At Step S120, the connected base station BS1 transmits an own position information to the ASV 6.

At Step S130, the ASV 6 computes, based on the state parameter transmitted from the terminal MT through the connected base station BS1, an antenna control parameter as follows: An angle $\alpha'$ is computed from the north direction to the connected base station BS1 based on the current position of the vehicle 1 and the position of the connected base station BS1.

An azimuth angle $\theta$ from the traveling direction of the vehicle 1 to the connected base station BS1 is computed as $\theta=\alpha-\alpha'$ based on the angle $\alpha$ and the angle $\alpha'$. The azimuth angle $\theta$ is thereby determined as an antenna control parameter.

At Step S132, the ASV 6 computes a predictable parameter for amending the antenna control parameter through predicting an approaching position as follows: A vehicle position after t minutes (e.g., 2 to 5 minutes) is predicted from the average speed and the azimuth angle of the traveling direction; an antenna control parameter $\theta'$ at the predicted approaching position after t minutes is computed similarly with the processing at Step S130. The predictable parameter $\Delta\theta$ after t minutes is computed as $\Delta\theta=\theta-\theta'$.

At Step S140, the ASV 6 transmits the antenna control parameter $\theta$ and the predictable parameter (t, $\Delta\theta$) to the terminal Mt through the connected base station BS1.

At Step S150, the terminal MT controls the directionality of the antenna 101 for directing the antenna beam to the direction of the connected base station BS1 (at angle $\theta$ against the traveling direction) based on the antenna control parameter $\theta$.

This control that is the same as control of directionality of the phased array antenna is executed by computing based on the above angle $\theta$ to control the phase shifters of the antenna control circuit 102. The antenna control circuit 102 thereafter controls the directionality of the antenna 101 based on the amended antenna control parameter that is amended after t minutes by $\Delta\theta$ based on the predictable parameter.

At Step S160, the terminal MT determines communications quality of a reception signal received from the connected base station BS1 through the antenna 101 whose directionality is controlled. When the quality is determined to be worse than predetermined quality, the directionality is amended based on the antenna control parameter as follows.

The communications quality is evaluated by the data processing circuit 106 of the terminal MT through measuring signal to interference ratio (SIR). When the SIR is lower than the predetermined threshold value, the communications quality is determined to be lowered. The directionality of the antenna 101 is thereby amended by the data processing circuit 102 through amending the antenna control parameter $\theta$ that is received from the connected base station BS1. The amending of the directionality of the antenna 101 is executed by amending the antenna control parameter $\theta$ by a predetermined very few degrees of an angle $\Delta\psi$ to clockwise or anticlockwise. This amending of the directionality of the antenna 101 is repeated until the SIR exceeds the predetermined threshold value or reaches the maximum value.

The reception SIR for evaluating the communications quality of the reception signal can be the same one that is measured for controlling transmission power in IMT-2000 (international mobile telecommunications) system. However, reception signal electric power (an average value) in the terminal MT can be also used for evaluating the communications quality.

As the directionality of the antenna is properly attained for the connected base station BS1, broadband data communications is started at Step S170.

According to the first embodiment, the terminal MT transmits, to the ASV 6, the state parameter including the current position, vehicle speed, traveling direction, and information relating to the connected base station BS1. The ASV 6 computes the azimuth angle to the connected base station BS1 from the terminal MT, based on the state parameter from the terminal MT, to transmit as the antenna control parameter. The terminal MT then directs the directionality of the antenna 101 based on the antenna control parameter without any computation of the antenna control parameter. This therefore results in lowering load of computing the antenna control parameter in the terminal MT and rapid controlling of the directionality of the antenna 101.

Second Embodiment

Figure 5:
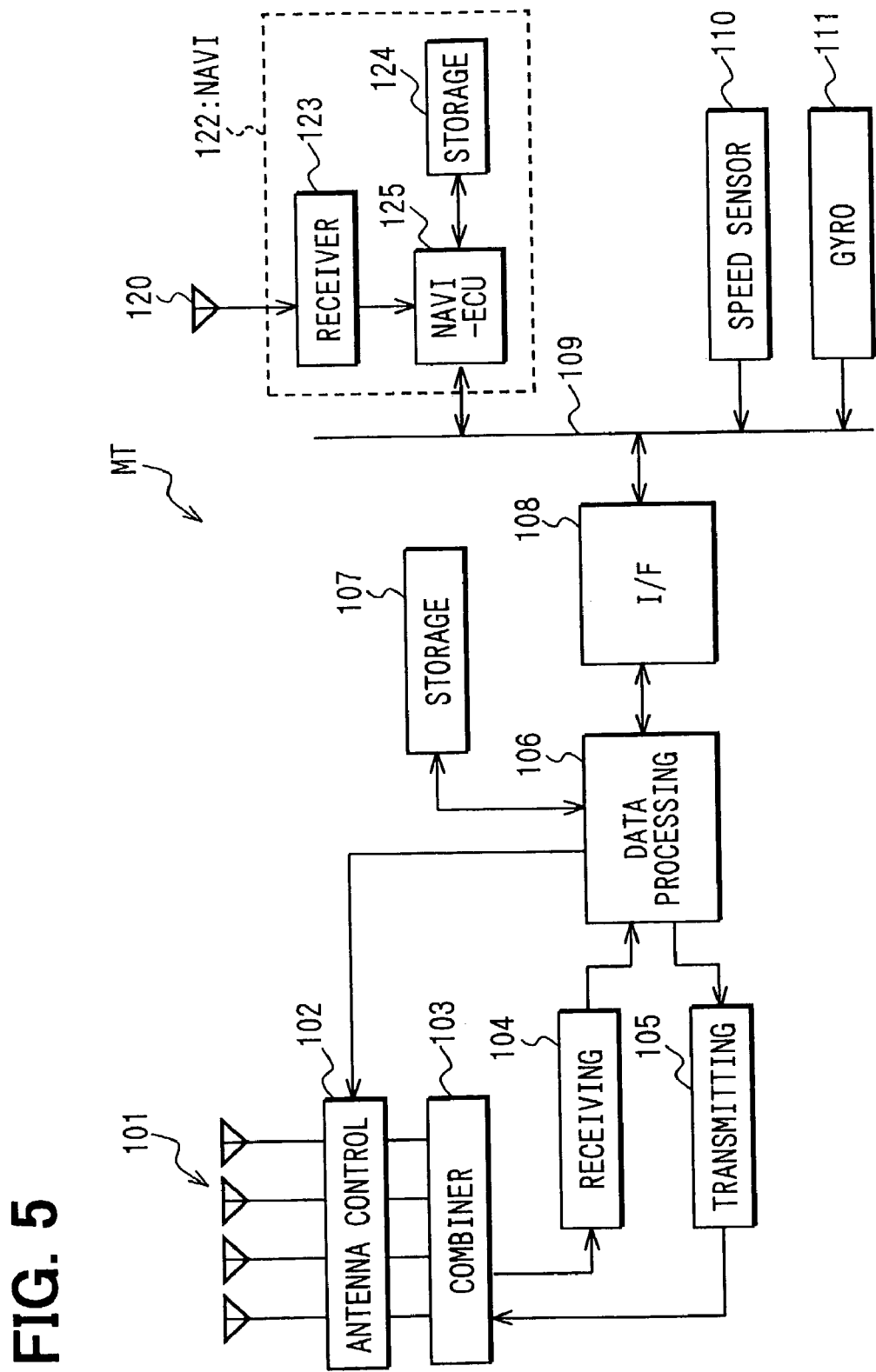
FIG. 5 is a block diagram showing structure of a mobile communication terminal according to a second embodiment.

In a second embodiment, a navigation system 122 is connected to a bus 109 instead of the autonomous positioning device 121 in the first embodiment, as shown in FIG. 5, and a terminal MT exchanges position data and a computed result for amending an antenna control parameter with the navigations system 122.

The navigation system 122 includes a receiver 123 for demodulating a reception signal of a GPS antenna 120, a storage unit 124, and a computing device (NAVI-ECU) 125. The storage unit 124 includes ROM for storing a program and map data for executing a function of the navigation system, and RAM for storing an antenna control parameter of the terminal MT along with position data including position information computed by the NAVI-ECU 125.

The NAVI-ECU 125 computes a current position of a vehicle 1 based on GPS signals from the receiver 123 and predicts an approaching position of the vehicle 1 based on the computed current position, the map data stored in the storage unit 124, and respective sensor signals from a speed sensor 110 and a gyroscope 111.

The NAVI-ECU 125 executes the processing of the ASV 6 at Step S132 in the first embodiment. The NAVI-ECU 125 computes for amending the antenna control parameter along with receiving, from the terminal MT, the antenna control parameter and SIR measured during communications.

Figure 6:
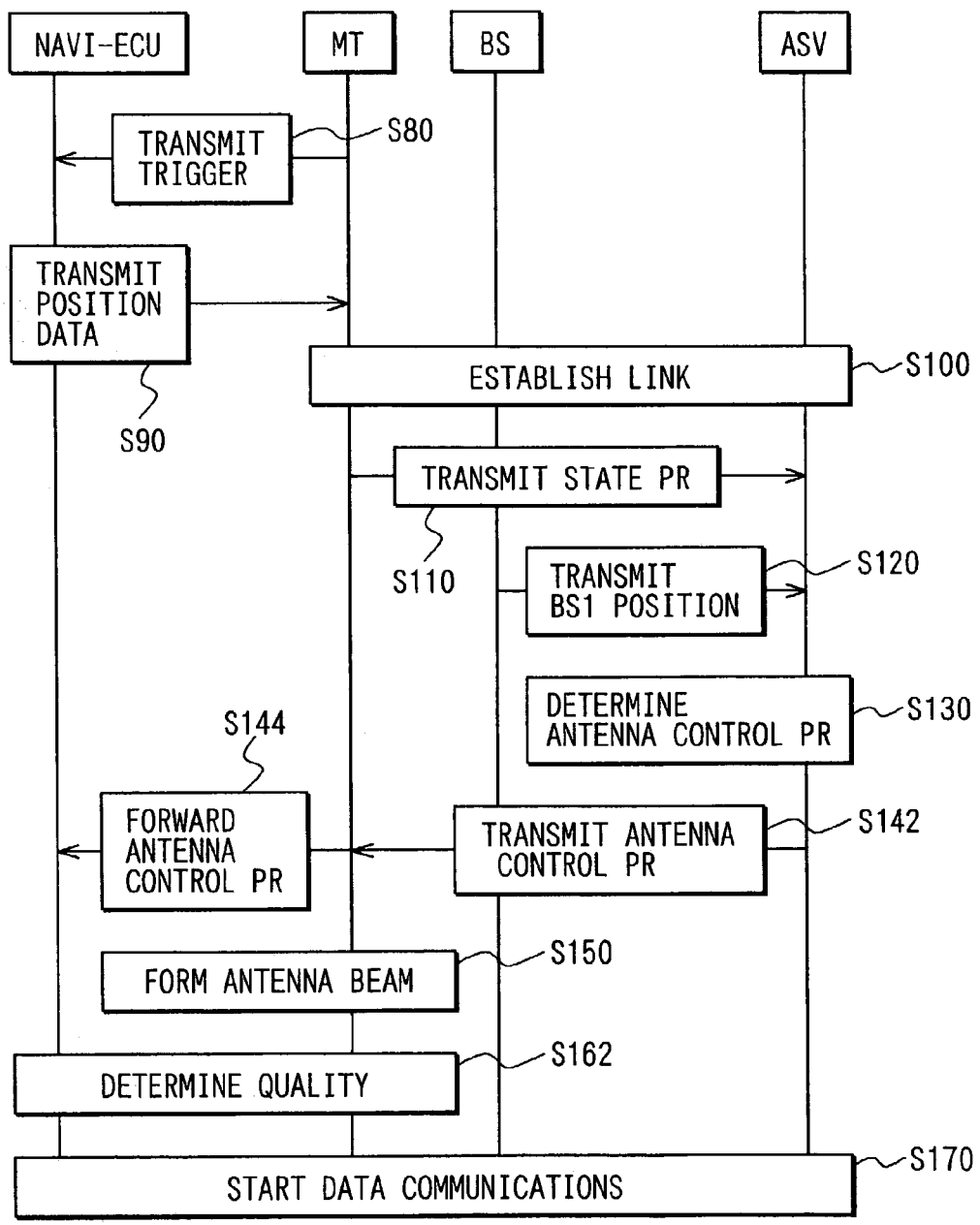
FIG. 6 is a flowchart diagram explaining a communications procedure according to the second embodiment.

A communications procedure in the second embodiment will be explained, especially regarding the processing different from that of the first embodiment, referring to FIG. 6.

At Step S80, the terminal MT transmits a trigger signal to the navigation system 122 before starting communications.

At Step S90, as the navigation system 122 receives the trigger signal, it computes a current position based on the GPS signals to transmit to the terminal MT. The computed position data are stored in the storage unit 124, and a map adjoining the vehicle 1 and a computed position are shown on a liquid crystal display (LCD) (not shown).

Processing at Steps S100 to S130 is the same as the processing in the first embodiment.

At Step S142, the ASV 6 transmits an antenna control parameter θ to the terminal MT through the connected base station BS1.

At Step S144, the terminal MT forwards, as necessary data for auxiliary control, the received antenna control parameter θ to the navigation system 122.

At Step S150, the terminal MT controls directionality of an antenna 101 for directing an antenna beam to a direction of the connected base station BS1 based on the antenna control parameter θ, similarly with the first embodiment.

At Step S162, the NAVI-ECU 125 determines communications quality, i.e., reception SIR of the terminal MT. When the reception SIR is lower than a predetermined threshold value, similarly with the processing at Step S160 in the first embodiment, amending of the directionality of the antenna 101 is executed by amending the antenna control parameter by a predetermined very few degrees of an angle $\Delta\psi$.

Here, a processing circuit 106 of the terminal MT amends the antenna control parameter θ based on the predicted approaching position of the vehicle 1 computed by the NAVI-ECU 125, and an antenna control circuit 102 controls the directionality of the antenna 101 accordingly.

The directionality of the antenna 101 of the terminal MT is directed to the connected base station BS1. This results in realizing high quality communications.

At Step S170, broadband data communications is started.

According to the second embodiment, the terminal MT and the navigation system exchange data and the navigation system 122 computes amendment of the antenna control parameter that controls the directionality of the antenna 101 of the terminal MT. This results in lowering load of computing the antenna control parameter in the data processing circuit 106 of the terminal MT and enabling adoption of the terminal whose computing capability is low.

Third Embodiment

In a third embodiment, position determination equipment (PDE) 7 provided in the CDMA network 4 computes a current position of a vehicle 1 necessary for the ASV's computing an antenna control parameter.

Figure 7:
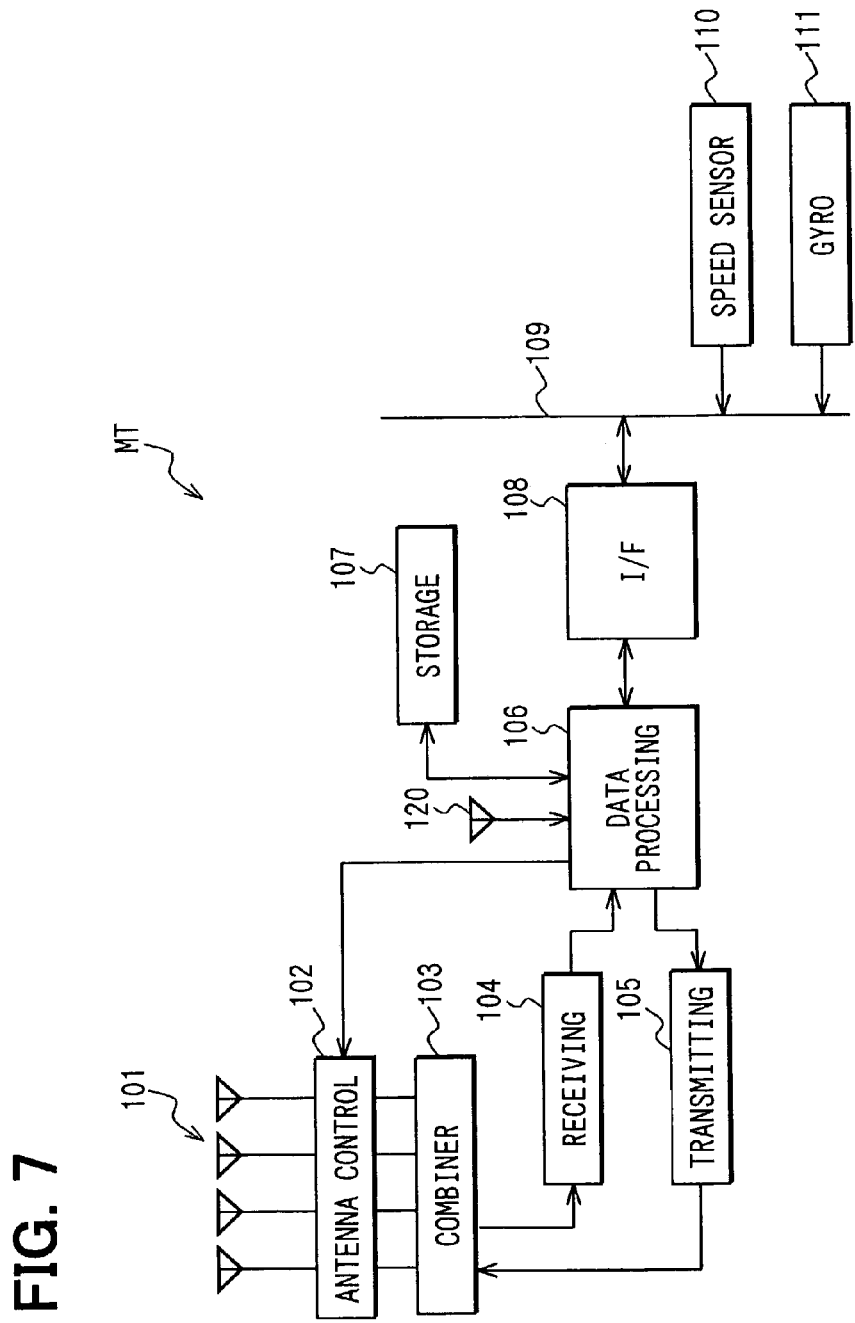
FIG. 7 is a block diagram showing structure of a mobile communication terminal according to a third embodiment.

As shown in FIG. 7, a terminal MT according to the third embodiment includes a GPS antenna 120 that receives GPS signals that include satellite numbers and GPS signal transmission time from the GPS satellites. The GPS signals are inputted directly to a data processing circuit 106. As explained later, the data processing circuit 106 transmits, to the CDMA network 4, the received GPS signals along with state parameter through a transmission module 105 and an antenna 101.

The state parameter in the third embodiment includes, in addition to an average speed, an azimuth angle of a traveling direction of the vehicle 1, current time, and information regarding base stations BS surrounding the vehicle 1 (e.g., identification numbers of the base stations) as information for specifying a vehicle position. This information regarding the surrounding base stations is included in pilot signals that the terminal MT receives from the respective base stations.

The PDE 7 provided in the CDMA network 4 computes a position of the vehicle 1 based on position computation request that is received from the terminal MT through a connected base station BS1 as follows. Here, the PDE 7 and each of the base stations synchronize with the GPS signals to be operated at the same clock at which the terminal MT operates.

The PDE 7 has position information of the respective base stations along with the identification numbers of the respective base stations. The PDE 7 receives from the terminal MT the GPS satellite numbers, position information (e.g., identification numbers) regarding the connected base station BS1 and the surrounding base stations BS included in the state parameter from the terminal MT. The PDE thereby determines the current position of the vehicle through triangular surveying based on the position information of the GPS satellites and base stations at the exact same time.

Figure 8:
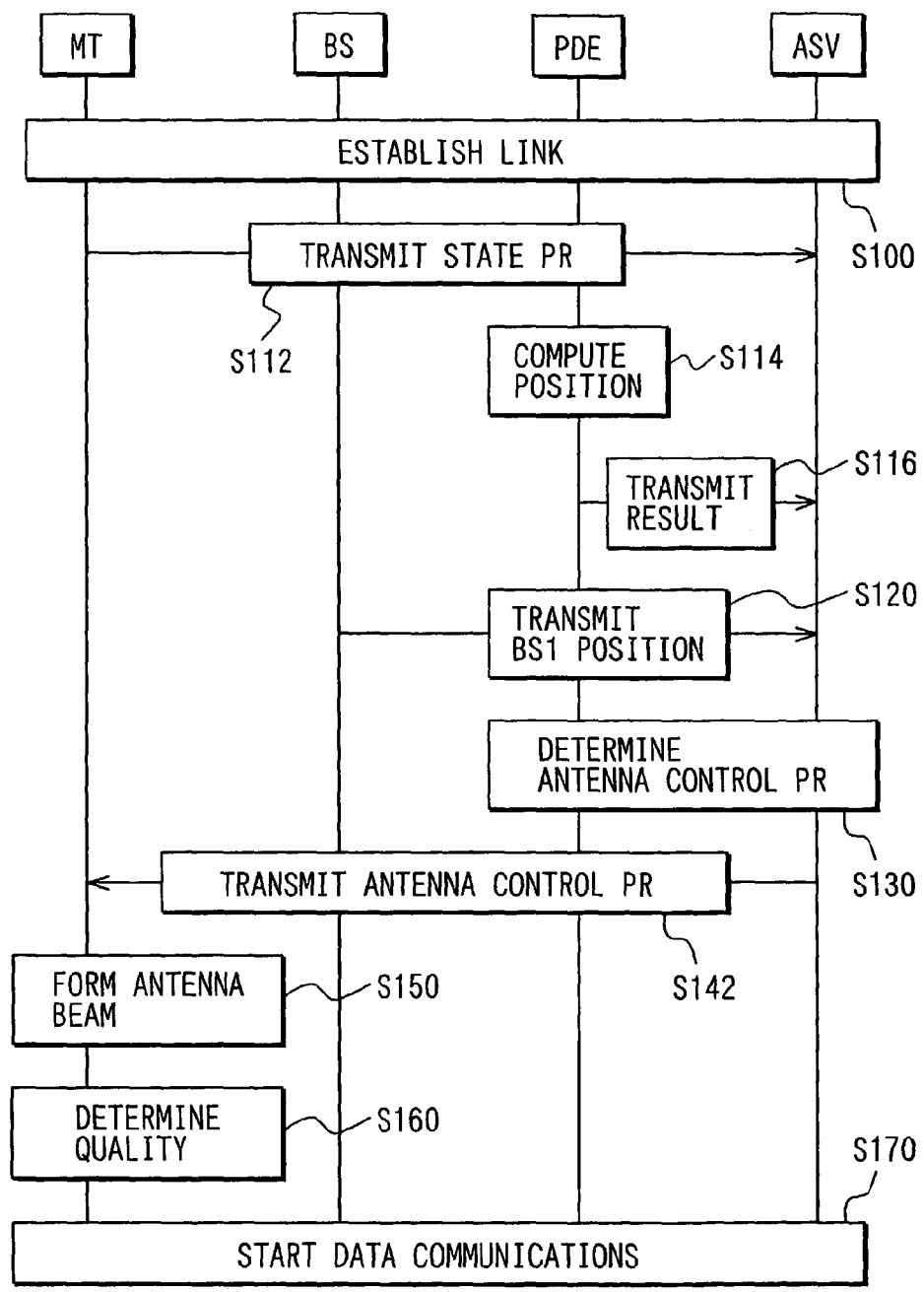
FIG. 8 is a flowchart diagram explaining a communications procedure according to the third embodiment.

A communications procedure in the third embodiment will be explained referring to FIG. 8, especially regarding different processing from the first and second embodiments.

At Step S10, similarly to the processing in the first embodiment, the terminal MT transmits a link request. At Step S112, the terminal MT transmits the state parameter. The state parameter in the third embodiment includes, as information for specifying a position of the vehicle 1, the surrounding base station information received by the terminal MT instead of the position information of the terminal MT included in the first embodiment.

At Step S114, the PDE 7 computes a current position of the vehicle 1 to transmit to the ASV 6 at Step S116.

At Step S120, the connected base station BS1 transmits own position information to the ASV 6.

At Steps S130 to S142, the ASV 6 computes an antenna control parameter θ to transmit to the terminal MT, similarly with the processing in the second embodiment.

At Step S150 to S170, similarly with the processing in the first embodiment, the terminal MT controls directionality of an antenna 101 based on the antenna control parameter θ to move to broadband data communications at Step S170.

Thus, in the third embodiment, the position of the terminal MT or the vehicles 1 is computed not by the terminal itself MT, but by the PDE 7 provided in the CDMA network 4. The directionality of the antenna 101 is therefore controlled without any autonomous positioning device in the vehicle 1.

Fourth Embodiment

In a fourth embodiment, an antenna is not a phased array antenna but a combined antenna of a first nondirectional antenna element 1010 and a second directional antenna element 1011. The first antenna element 1010 is a nondirectional antenna element 1010 while the second antenna element 1011 is formed of six antenna elements 1011a to 1011f that have beams of predetermined directions and are disposed in a circumference.

Figure 9A:
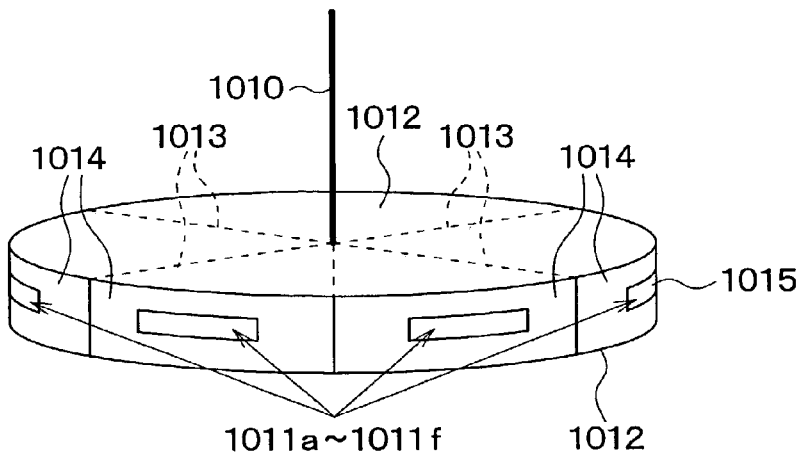
FIGS. 9A and 9B are views showing structure of an antenna of a mobile communication terminal according to a fourth embodiment.
Figure 9B:
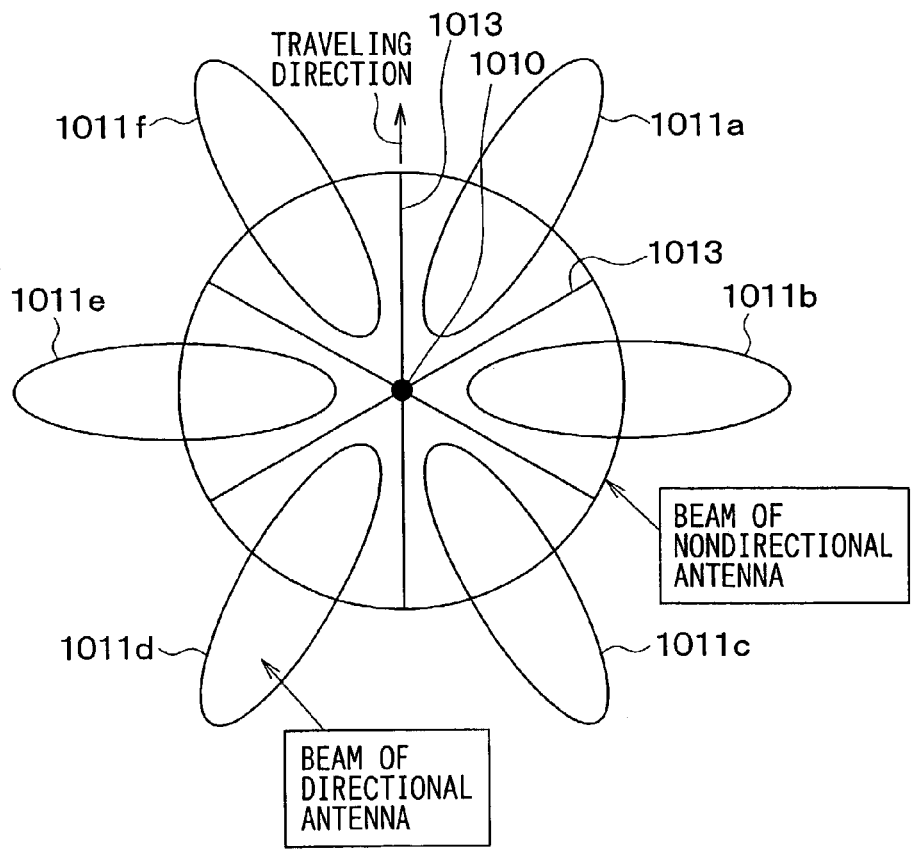

In FIG. 9A, a perspective view of structure of the antenna provided in a terminal MT of the fourth embodiment is shown. In FIG. 9B, radiating beams of the antenna are shown with a traveling direction of a vehicle 1 being shown in a central top of FIG. 9A.

The nondirectional antenna element is formed of, e.g., monopole antenna element 1010 and provided in a roof (not shown) of the vehicle 1.

The directional antenna element is formed of slot antenna elements 1011a to 1011f using a radial wave guide tube. Two parallel circular metal plates 1012 form a space, which is then partitioned into six sectors by three metal plates 1013 that are radially disposed.

Each sector has a metal circumferential wall portion 1014, which has a curved rectangular slot 1015 that has a longer side (longitudinal side) in a circumferential direction than in a vertical direction of FIG. 9A.

Respective feed probes (not shown) of directional antennas protrude towards a central axis of the sectors from one of the circular metal plates. The slot antenna element 1011a thereby radiates a beam within 60 degrees clockwise from the vehicle traveling direction.

Similarly, the slot antenna elements 1011b to 1011f radiate beams within 60 to 120 degrees, 120 to 180 degrees, 180 to 240 degrees, 240 to 300 degrees, and 300 to 360 degrees from the vehicle traveling direction, respectively.

Thus, as shown in FIG. 9B, radiating beams from the monopole antenna element 1010 and the slot antenna elements 1011a to 1011f are obtained. In particular, when the slot has a longitudinal side in a horizontal direction, the second directional antenna element having half beamwidth (angle) can be formed in six directions on a horizontal plane.

Figure 10:
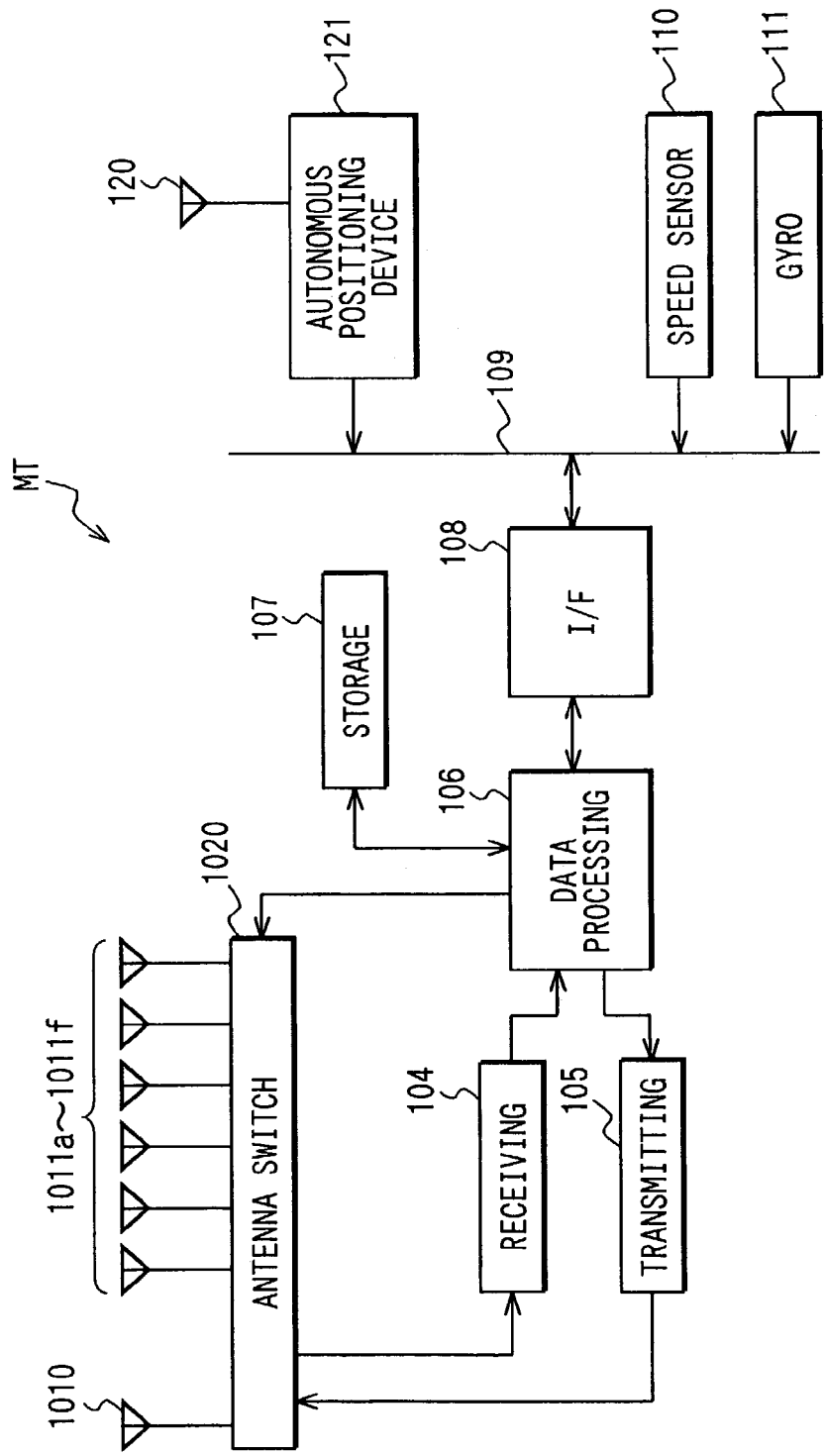
FIG. 10 is a block diagram showing structure of a mobile communication terminal according to the fourth embodiment.
Figure 11:
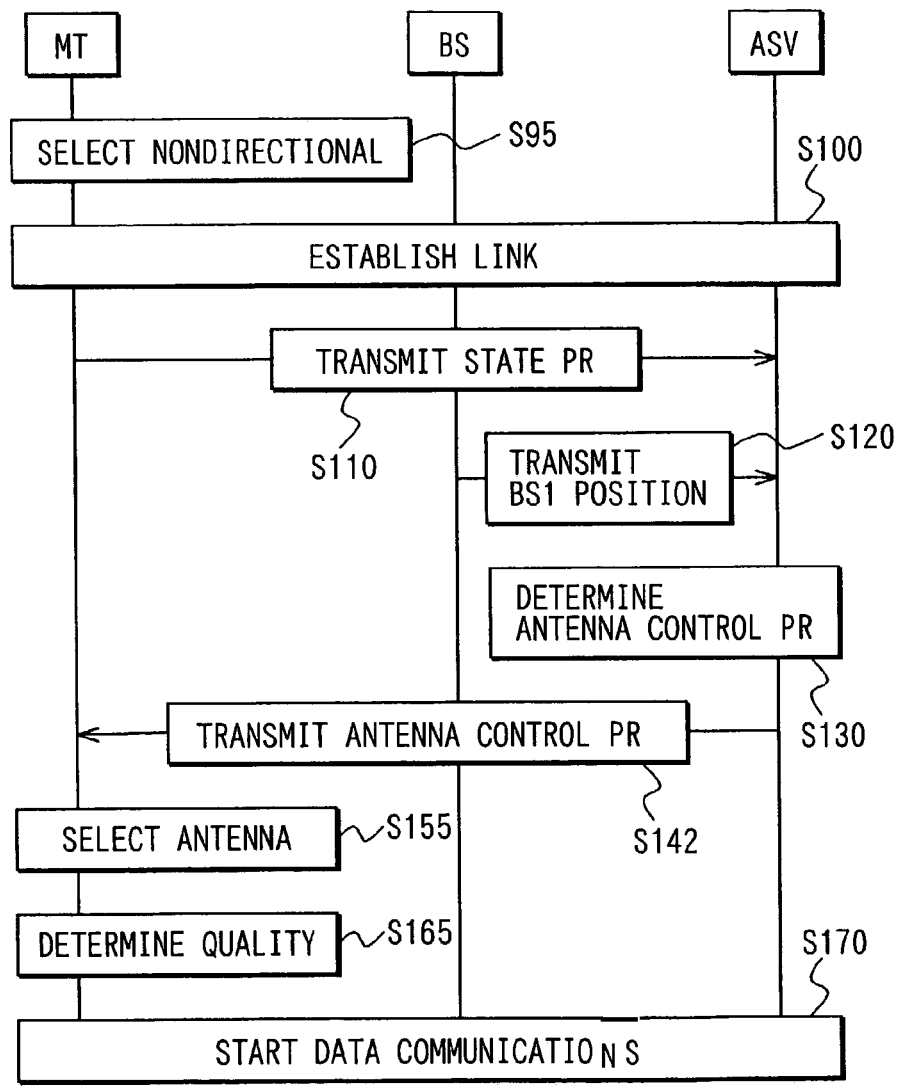
FIG. 11 is a flowchart diagram explaining a communications procedure according to the fourth embodiment.

In FIG. 10, structure of the terminal MT of the fourth embodiment is shown and the terminal MT has the monopole antenna element 1010, the slot antenna elements 1011a to 1011f, as explained above, and an antenna switch unit 1020.

Output signals from the monopole antenna element 1010 and slot antenna elements 1011a to 1011f are inputted to the antenna switch unit 1020.

The antenna switch unit 1020 is used for switching output and input terminals, by a control signal from a data processing circuit 106. Internally, a transmission module 105 or a reception module 104 is selected. Externally (to the antenna elements), one of outputs from the monopole antenna element 1010 and slots antenna elements 1011a to 1011f or synthesized output of adjoining two slot antenna elements is selected. The antenna switch unit 1020 inputs, in receiving, a reception signal from one of the nondirectional antenna element and the directional antenna element to a reception module 104. It transmits, in transmitting, a transmission signal from the transmission module 105 through one of the nondirectional antenna element and the directional antenna element.

The data processing circuit 106 selects one of the slot antenna elements according to an antenna control parameter θ, namely an azimuth angle of a connected base station BS1 from the vehicle traveling direction. For instance, when the antenna control parameter θ is a range from 0 to 60 degrees, the slot antenna element 1011a is selected. When the antenna control parameter θ is a range from 60 to 120 degrees, the slot antenna element 1011b is selected. And so forth, the respective slot antennas 1011c to 1011f are selected according to the antenna control parameter θ.

A communications procedure in the fourth embodiment will be explained below, especially regarding processing different from the processing in the first embodiment.

At Step S95, the terminal MT controls the antenna switch unit 1020 for selecting the nondirectional antenna of the monopole antenna 1010 and the transmission module 105, so as to communicate with a base station BS.

At Steps S100 to S140, processing is the same as the processing in the first embodiment.

At Step S155, according to the antenna control parameter θ, a required antenna among the slot antenna elements 1011a to 1011f is selected.

At Step S165, SIR of a reception signal through the selected slot antenna element is determined. When the SIR is determined to be lower than a predetermined threshold value, next SIR of a reception antenna through a slot antenna element that adjoins, in clockwise or in anticlockwise, the previously selected slot antenna element is determined.

Finally, when the maximum SIR is determined, the slot antenna element that enables the maximum SIR is selected for establishing broadband data communications.

In this case, the antenna switch unit 1020 can synthesize output signals from two adjoining slot antenna elements through which the SIR can become the maximum.

As explained above, in the fourth embodiment, a plurality of antenna elements whose radiating beams are previously set are used. Even simple structure of selecting one of the slot antenna elements can thereby control the directionality of the antenna.

(Other Modifications)

The phased array antenna that forms a directional beam by controlling each phase of the plurality of the non-directional antenna elements is used for an antenna 101 in the first to third embodiments. However, an adaptive array antenna can be used. The adaptive array antenna forms a null point of beam for a predetermined direction by controlling a weighting coefficient for amplitude and phase applied on an antenna element. In this case, the ASV 6 can compute the weighting coefficient as an antenna control parameter.

What is claimed is:

1. A mobile station that travels to a traveling direction at a traveling speed and communicates from an own position through an antenna with a plurality of base stations forming a communications network, comprising:

own position detecting means for detecting an own position based on Global Positioning System signals obtained via a receiver;

map data storing means for storing map data;

approaching position predicting means for predicting an approaching position based on information including the detected own position and the stored map data;

transmitting means for transmitting, to any one of the base stations, a state parameter that includes at least position-specifying information that specifies the own position detected by the own position determining means;

receiving means for receiving, from any one of the base stations, an antenna control parameter for controlling antenna directionality of the antenna, wherein the antenna control parameter is computed, based on the state parameter, in the communications network;

antenna controlling means for controlling, based on the received antenna control parameter, the antenna directionality for aiming at a given base station of the base stations so as to increase signal strength of a reception signal from the given base station; and amending means for amending the antenna control parameter based on the approaching position predicted by the approaching position predicting means.

2. A mobile station according to claim 1,
wherein the antenna controlling means controls, according to a direction to any one of the base stations from the own position, at least one of four directions, wherein a first direction is a direction on a horizontal plane of a beam of the antenna, a second direction is a direction on a vertical plane of the beam, a third direction is a direction of half beamwidth of the beam, and a fourth direction is a direction of a null point of the beam.

3. A mobile station according to claim 1,
wherein the state parameter includes, as the position-specifying information, at least one of own-position information regarding the own position and base-station information regarding a surrounding base station of the base stations.

4. A mobile station according to claim 3, wherein, when the base-station information is included in the state parameter, the antenna control parameter is determined, in the communications network, according to a position computed based on the base-station information included in the state parameter.

5. A mobile station according to claim 1,
wherein the approaching position predicting means predicts a traveling direction, and
wherein the amending means amends based on the predicted traveling direction, the antenna control parameter that is received by the receiving means.

6. A mobile station according to claim 1,
wherein the antenna control parameter corresponds to an azimuth angle of the given base station relative to the traveling direction.

7. A mobile station according to claim 1,
wherein the receiving means measures communications quality of the reception signal of the given base station, and
wherein the amending means amends the antenna control parameter when the communications quality is determined to be lower than a predetermined value.

8. A mobile station according to claim 1,
wherein the state parameter further includes the traveling speed, and
wherein the antenna control parameter is amended according to a predicted traveling direction computed based on the traveling direction and the traveling speed.

9. A mobile station according to claim 1,
wherein the antenna and the antenna control are included in a phased array antenna.

10. A mobile station according to claim 1,
wherein the antenna includes a first antenna element and a second antenna element,
wherein the first antenna element is nondirectional for transmitting the state parameter and receiving the antenna control parameter,
wherein the second antenna element forms a directional beam for being directed to one of a plurality of azimuth angles, and
wherein the antenna control means controls, based on the antenna control parameter, the second antenna element for forming the directional beam for being directed to a required azimuth angle.

11. A mobile station according to claim 1, wherein the approaching position predicting means is configured to predict an approaching position based on information including not only the detected own position and the stored map data but also sensor signals from a speed sensor and a gyroscope.

12. A method for controlling directionality of an antenna in a mobile station communicating via a plurality of base stations to an application server in a communications network, the method comprising:

storing map data;

detecting an own position based on Global Positioning System signals obtained via a receiver;

predicting an approaching position based on information including the detected own position and the stored map data;

transmitting means for transmitting, via any one of the base stations to the application server in the communications network, a state parameter that includes at least position-specifying information that specifies the detected own position;

receiving, via any one of the base stations from the application server, an antenna control parameter for controlling antenna directionality of the antenna, wherein the antenna control parameter is computed, based on the state parameter, in the application server;

controlling, based on the received antenna control parameter, the antenna directionality for aiming at a given base station of the base stations so as to increase signal strength of a reception signal from the given base station; and amending the antenna control parameter based on the predicted approaching position.

* * * * *